US007019214B2

(12) United States Patent
Kübel et al.

(10) Patent No.: US 7,019,214 B2
(45) Date of Patent: Mar. 28, 2006

(54) DEVICE FOR SUPPORTING OR ROUTING LINES IN PASSAGES

(75) Inventors: Johann Kübel, Kasten (AT); Helmut Kadrnoska, Vienna (AT); Gerhard Reiss, Laxenburg (AT)

(73) Assignee: Wien Kanal-Abwassertechnologien GesmbH, Vienna (AT)

( * ) Notice: Subject to any disclaimer, the term of this patent is extended or adjusted under 35 U.S.C. 154(b) by 0 days.

(21) Appl. No.: 10/985,519

(22) Filed: Nov. 10, 2004

(65) Prior Publication Data

US 2005/0145756 A1 Jul. 7, 2005

Related U.S. Application Data

(63) Continuation of application No. PCT/AT03/00133, filed on May 9, 2003.

(30) Foreign Application Priority Data

May 10, 2002 (DE) .............................. A 724/2002

(51) Int. Cl.
*H02G 3/04* (2006.01)

(52) U.S. Cl. ......................... 174/68.3; 174/48; 174/97; 174/100; 174/101; 59/78.1

(58) Field of Classification Search .................. 174/37, 174/48, 68.1, 68.3, 96–101; 59/78.1; 138/108, 138/113, 117; 248/49, 53, 57, 67.7, 68.1, 248/73; 385/100, 102, 106, 134, 137
See application file for complete search history.

(56) References Cited

U.S. PATENT DOCUMENTS 3,053,358 A 9/1962 Gross
3,430,662 A * 3/1969 Guarnaschelli ............ 174/68.3
4,023,834 A 5/1977 Ewing et al.
4,852,342 A * 8/1989 Hart ........................... 59/78.1
4,988,838 A * 1/1991 Kirtland ..................... 59/78.1
5,027,595 A * 7/1991 Hart ........................... 59/78.1
5,240,209 A 8/1993 Kutsch
5,642,612 A * 7/1997 Hughes ...................... 59/78.1
5,778,656 A * 7/1998 Hart ........................... 59/78.1
5,871,182 A 2/1999 Johnson et al.
5,900,586 A * 5/1999 Carr ............................ 174/95
6,070,836 A * 6/2000 Battie et al. ............... 248/68.1
6,116,547 A 9/2000 Johnson et al.
6,191,363 B1 * 2/2001 Samuels .................... 174/68.3
6,433,282 B1 * 8/2002 Traversa ...................... 174/95
6,609,684 B1 * 8/2003 Van Scoy et al. ............. 248/49
6,789,383 B1 * 9/2004 Plush et al. .................. 59/78.1
6,896,344 B1 * 5/2005 Tsutsumi et al. ............ 59/78.1

FOREIGN PATENT DOCUMENTS

AT 408 139 B 9/2001

(Continued)

*Primary Examiner*—Dean A. Reichard
*Assistant Examiner*—Adolfo Nino
(74) *Attorney, Agent, or Firm*—Laurence A. Greenberg; Werner H. Stemer; Ralph E. Locher

(57) ABSTRACT

A device for supporting or routing lines in passages, in particular sewers, has a cable conduit that accommodates the lines. The cable conduit is made up of single segments that are connected to each other, which has a base from which cheek pieces protrude. The base is made up of adjacent segments, preferably of sheet metal, that are connected flexibly to one another. Cheek pieces that project from the base are formed of a flexible material, preferably plastic.

24 Claims, 6 Drawing Sheets

FOREIGN PATENT DOCUMENTS

| | | |
|---|---|---|
| DE | 298 01 424 U1 | 5/1998 |
| DE | 198 36 923 A1 | 2/2000 |
| EP | 1 011 180 A1 | 6/2000 |
| GB | 2 163 302 A | 2/1986 |

* cited by examiner

DEVICE FOR SUPPORTING OR ROUTING LINES IN PASSAGES

CROSS-REFERENCE TO RELATED APPLICATION

This is a continuing application, under 35 U.S.C. § 120, of copending international application No. PCT/AT 03/00133, filed May 9, 2003, which designated the United States; this application also claims the priority, under 35 U.S.C. § 119, of Austrian patent application No. A 724/2002, filed May 10, 2002; the prior applications are herewith incorporated by reference in their entirety.

BACKGROUND OF THE INVENTION

Field of the Invention

The present invention relates to a device for supporting or routing lines in canals and similar passages, in particular in sewers. The device has a cable conduit that accommodates the lines and which is made up of single segments that are connected to each other. The segments are formed with a base and cheek pieces projecting from the base.

The term "line" as used herein should be understood to include all lines, but in particular fiber optic cables, as well as other live cables and/or those that carry a liquid or gaseous medium.

Recently there has been an increasing need to run fiber optic cables into individual building lots or into buildings located on such lots. In order to avoid excavating to the greatest extent possible, it is known that such cables can be installed in existing sewers. To this end, cable conduits are mounted on the sewer walls, particularly in main sewers that are accessible; the fiber optic cables are then secured to these cable conduits. The placement of cable conduits of the kind customarily used up to now becomes problematic in the case of inaccessible sewers that are assembled from sections of pipe, in which at specific intervals there are cleanout or inspection shafts that lead to the surface. Certainly, it is possible to introduce cable guides into sewers of this kind by way of such shafts; nevertheless, this also rendered more difficult because branch sewers—for example, to residences—must be kept free of such cable guides in order to prevent blockages caused by solids adhering to the cable guides.

Austrian patent AT 408 139 B describes how flexible pipes are installed in supporting profiles assembled from sections; these supporting profiles comprise a base and cheek pieces that extend from the base and are connected to it so as to form a single piece. The individual sections can be coupled together at their ends through insertible connectors so that they are flush with each other. This configuration makes it possible to accommodate pipes, in particular pipes that are of plastic and which are subjected to considerable thermal dilatation, and compensate for the resulting changes in length.

SUMMARY OF THE INVENTION

It is accordingly an object of the invention to provide a device for supporting and guiding lines in canals which overcomes the above-mentioned disadvantages of the heretofore-known devices and methods of this general type and which device can be fixed in position on the walls of sewers, even of inaccessible sewers, by way of a robotic device designed for work in such passages, and thereby adapted to specific requirements. This means that it is necessary to fix the cable conduits in locations where the flow through the sewer will not be impeded, i.e., as far as possible at the top or crown of the sewer, although it is essential to be able to change the particular location in those vicinities where there are junction points, so as to ensure that the flow through the sewer in not impeded.

With the foregoing and other objects in view there is provided, in accordance with the invention, a device for supporting or routing lines, comprising:

a cable conduit for accommodating the lines, the cable conduit being formed with a plurality of interconnected individual segments;

each of the segments having a base and cheek pieces projecting from the base;

the base of a respective the segment being flexibly jointed with the base of an adjoining the segment, and the cheek pieces being formed of a flexible material.

Preferably, the flexible material of the cheek pieces is plastic and the base is formed of sheet metal.

In other words, the objects of the invention are achieved with the foregoing configuration. Here, the configuration makes it possible to swivel the cable channel in the plane of the base, so that the individual segments swivel about the flexible connection and—due to the fact that they are of flexible material—the cheek pieces adapt to the position of the segments that form the base. Thus it is possible that the cable conduit curves in the desired manner.

The configuration according to the present invention also permits simple assembly of the cable conduit in the area of a shaft. When this is done, the segments are so swiveled about the flexible connection that-arranged one above the other-they form a stack that can be introduced into the sewer opening by way of the shaft, where the stack of segments deploys and the individual segments are connected to the cheek pieces, which are flexible and can thus be transported in the form of a roll. According to the present invention, the cheek pieces incorporate side slots that accommodate the edges of the segments that form the base.

It is preferred that the edges of the segments that are accommodated by the slot be curved in an arc so that these edges are introduced into the slots along the radius of curvature by pivoting the cheek pieces and are securely connected to the cheek pieces as a result.

According to one preferred embodiment of the present invention, adjacent segments are connected by hollow rivets and can swivel about the axes of these rivets, which are approximately perpendicular to the plane of the base, so that a flexible connection between the individual segments is created in a simple manner and, if the heads of the hollow rivets are countersunk, there are no projections that can interfere with the flow through the sewer. Above all, however, this configuration entails the advantage that fasteners that can be anchored in the passage walls, preferably self-tapping screws, can be installed through these hollow rivets.

It is preferred that pipes that have several channels that can accommodate, in particular, fiber optic cables, be supported within the cable conduits.

According to the present invention, in order to permit the subsequent attachment of additional lines to previously installed cable conduits, at least one cheek piece has at least one chamber that extends through it in the longitudinal direction; this can accommodate such an additional line. In order to simplify insertion of such an additional line, it is expedient that the chamber have at least one side opening that can preferably be closed, at least partially, by at least one flexible lip. The flexible lip prevents the additional line from slipping out of place once it has been inserted.

In one preferred embodiment of the present invention, within the cable conduit there is a spacer that protrudes from the base and preferably covers the hollow rivets. This spacer separates two lines, or the pipes that contain such lines and, if it is disposed above the hollow rivets through which the fasteners are installed, prevents such fasteners from damaging the lines or pipes, since these then pass through the spacer. It is preferred that the spacer be of foam that provides flexible support for the lines or pipes and adapts to the shape of the cable conduit.

If a self-tapping screw is used as the fastener then, according to another embodiment of the present invention, this is surrounded along part of its threaded section by a sealant, preferably a silicone sealant. When the self-tapping screw is inserted, this sealant seals off the sewer wall around the hole for the fastener.

As has been discussed heretofore, the cable conduit is disposed in this sewer between the shafts that are connected to the sewer and lead to the surface. In order to permit problem-free connection to a line that runs into the connecting sewer, on the one hand, and branch lines on the other hand, and to do so without unacceptably tight curves that would damage fiber optic cables were they permitted, in the device according to the present invention the cable conduit is connected to a conduit box that is provided in such a shaft; this conduit box incorporates an extension piece that accommodates the lines and can be coupled to the cable conduit. This extension piece can be so formed that the lines that are routed through the extension piece do not incorporate any inadmissibly tight curves and their ends are connected to continuation lines through clamps that are located within the conduit box.

In addition, in the end area that has the extension piece, the conduit box can be provided with a rounded guide surface, over which a high-pressure cleaning hose that is to be inserted into the passage when it is to be cleaned is routed. This means that there is no longer any need for the system of guide rollers for the cleaning hose that was formerly essential and had to be installed in the transition area between the shaft and the wall of the sewer on special supporting brackets. This guide surface is bordered by cheek pieces so as to prevent the cleaning hose from slipping laterally off the guide surface.

It is also possible to provide the conduit box with studs that protrude from its sides and serve to attach or support guide rollers for a high-pressure cleaning hose.

Other features which are considered as characteristic for the invention are set forth in the appended claims.

Although the invention is illustrated and described herein as embodied in a device for supporting or routing lines in passages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
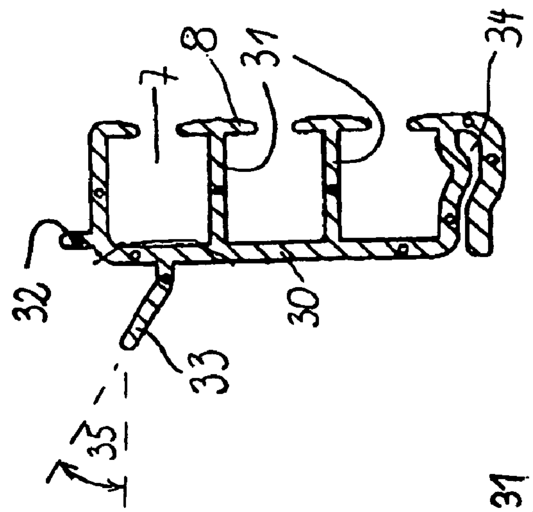
FIG. 1A is a diagrammatic cross section through a cheek piece.
Figure 1:
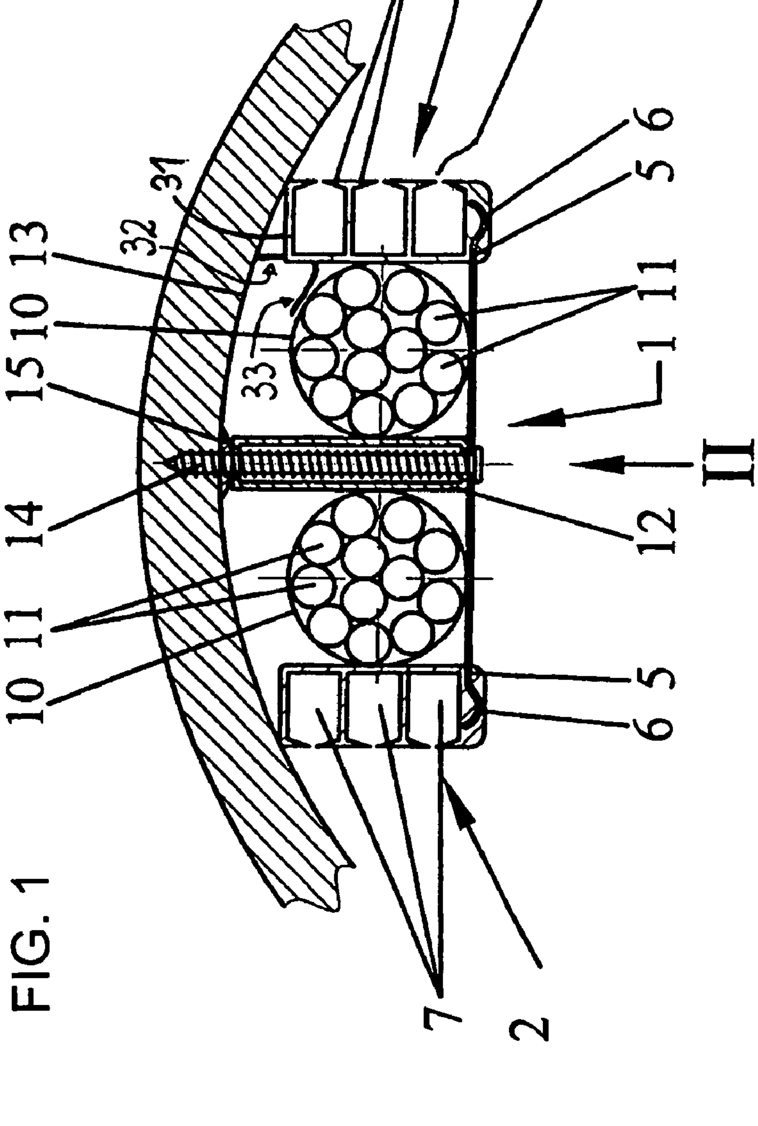
FIG. 1 is a cross section through the cable conduit of a device according to the present invention, along the line I—I in FIG. 2.
Figure 2:
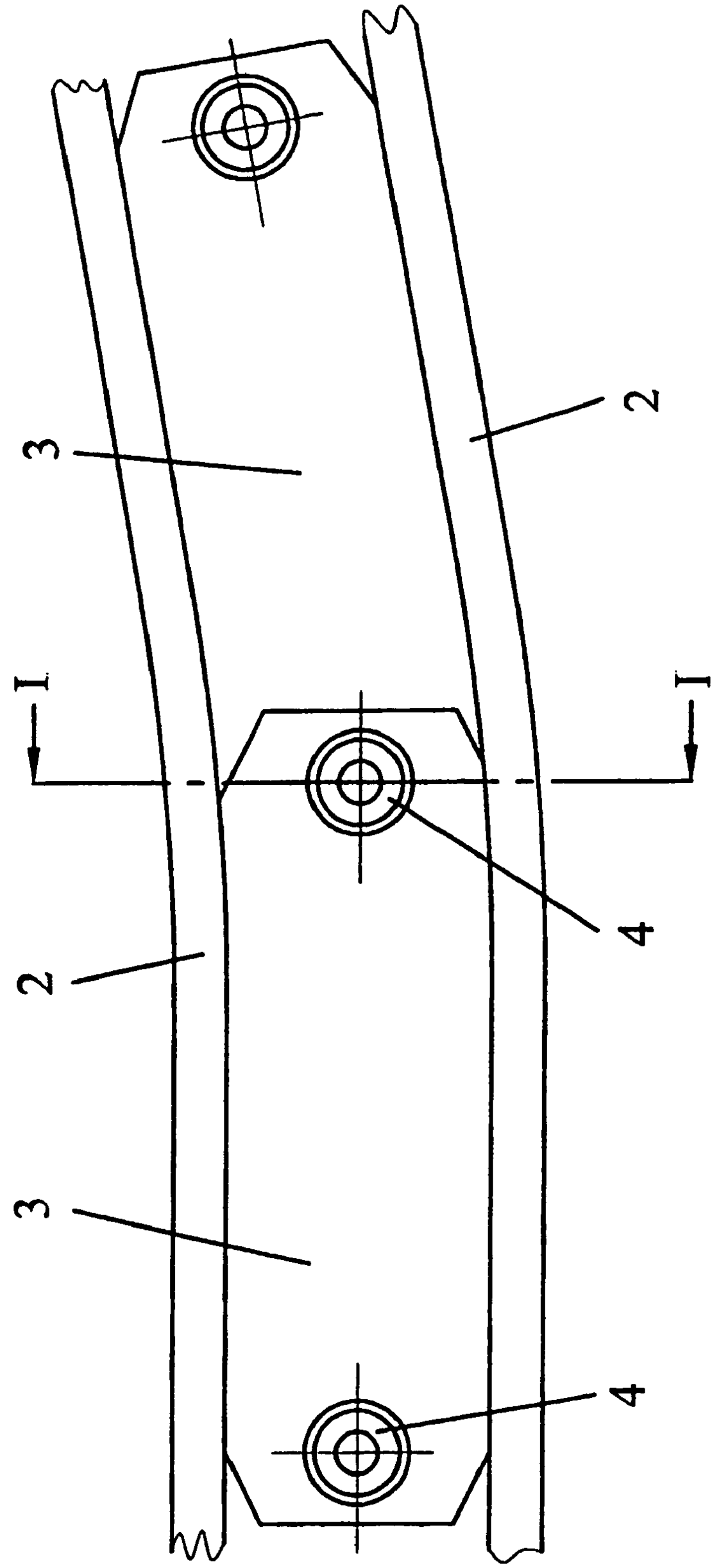
FIG. 2 is a partial plan view of the cable conduit as viewed from below in the direction indicated by the arrow II in FIG. 1.

Referring now to the figures of the drawing in detail and first, particularly, to FIGS. 1 and 2 thereof, the device according to the present invention, which is used to support or route lines in sewers includes the cable conduit shown in FIG. 1 and FIG. 2. This cable conduit comprises a base 1 and side walls, or cheek pieces 2 that extend from the base 1. As can be seen in FIG. 2, the base 1 comprises individual sheet-metal segments 3 that are connected flexibly to one another by way of hollow rivets 4, the heads of which are countersunk into the segments 3 so that they do not protrude and thereby impede the flow through the sewer.

The cheek pieces 2 are formed from flexible plastic. They incorporate side slots 5 that accommodate arc-shaped edges 6 of the segments 3 forming the base 1. The edges 6 can be introduced into the slots 5 by pivoting the cheek pieces 2 about the radius of curvature of the edges 6 of the segments 3, after which they are securely anchored in the cheek pieces 2.

As can be seen from FIG. 1, the cheek pieces 2 have continuous chambers 7 formed with side openings 9 that can be partially closed by the flexible lips 8, and by which additional lines can be supported in the cable conduit. The additional lines are introduced through the openings 9.

Two pipes 10 that enclose channels 11 are disposed in the space between the cheek pieces 2. Lines, preferably fiber optic cables, are routed through these pipes. The pipes 10 are separated from one another by a spacer 12 that is of hard plastic and thus provides flexible support for the pipes 10 and can adapt to the curvature of the cable conduit. The spacer 12 is disposed above the hollow rivets 4.

Figure 3:
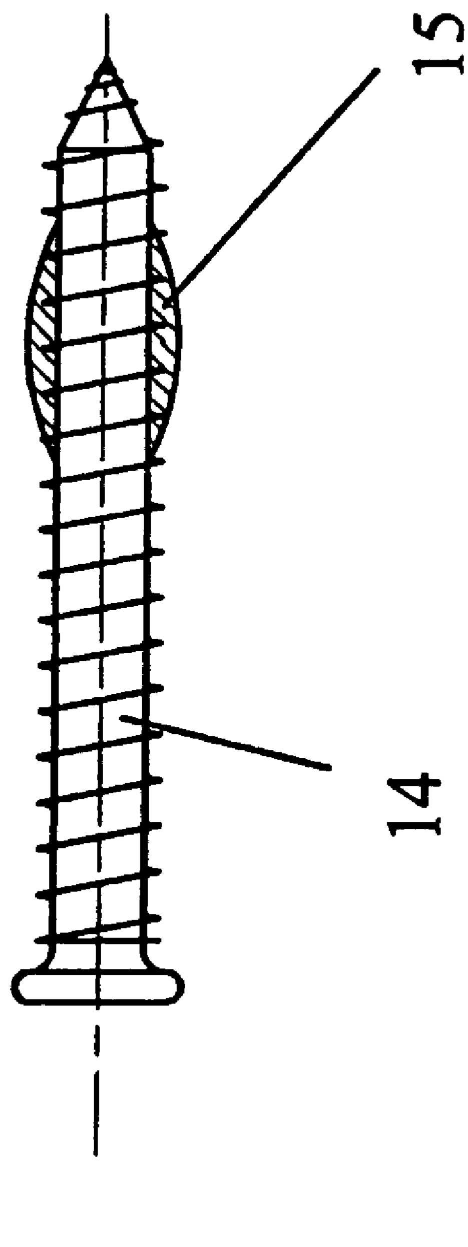
FIG. 3 is a side view of a self-tapping screw for attaching the cable conduit to a sewer wall.

Self-tapping screws 14, shown in detail in FIG. 3, are used to secure the cable conduit to the sewer wall 13. The screws 14 pass through the hollow rivets 4 and the spacer 12, and they are anchored in the sewer wall. Each self-tapping screw 14 is surrounded along a section of its thread by a silicone sealant 15 which, as can be seen from FIG. 1, seals off the screw hole in the passage wall once the screw has been inserted.

Figure 4:
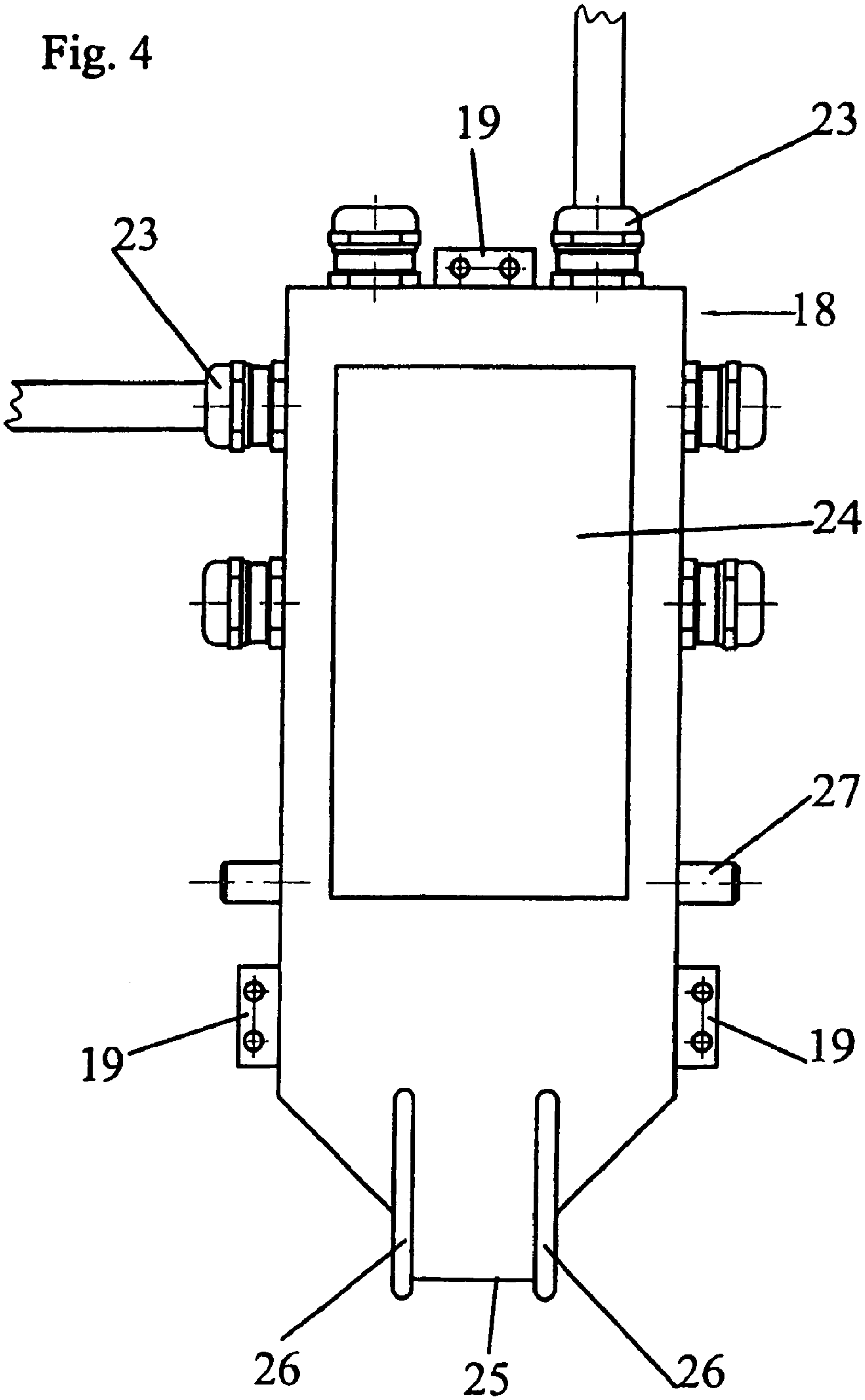
FIG. 4 is an elevational front view of a conduit box mounted in a shaft.
Figure 5:
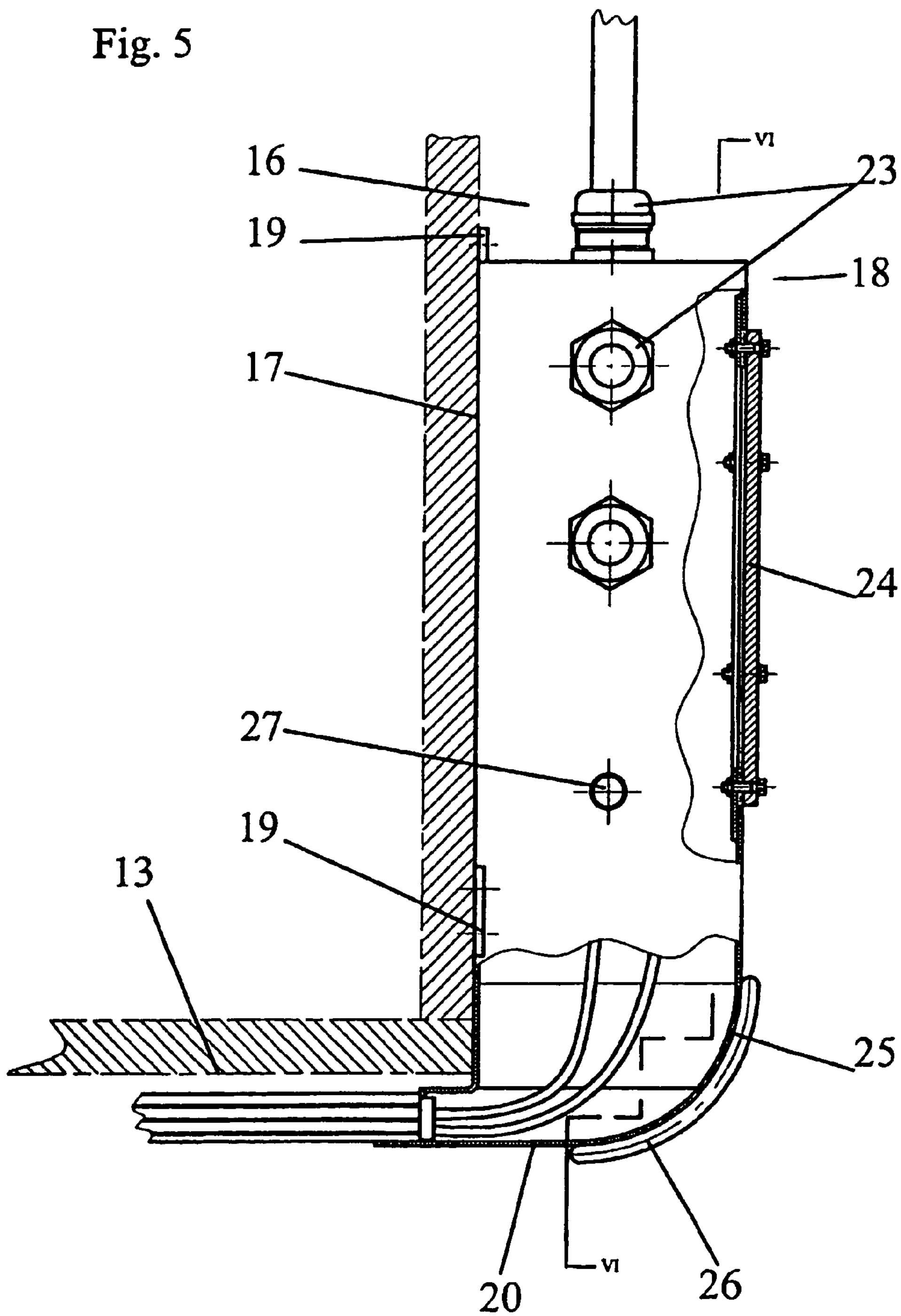
FIG. 5 is a side view, in partial cross section, of the conduit box shown in FIG. 4.
Figure 6:
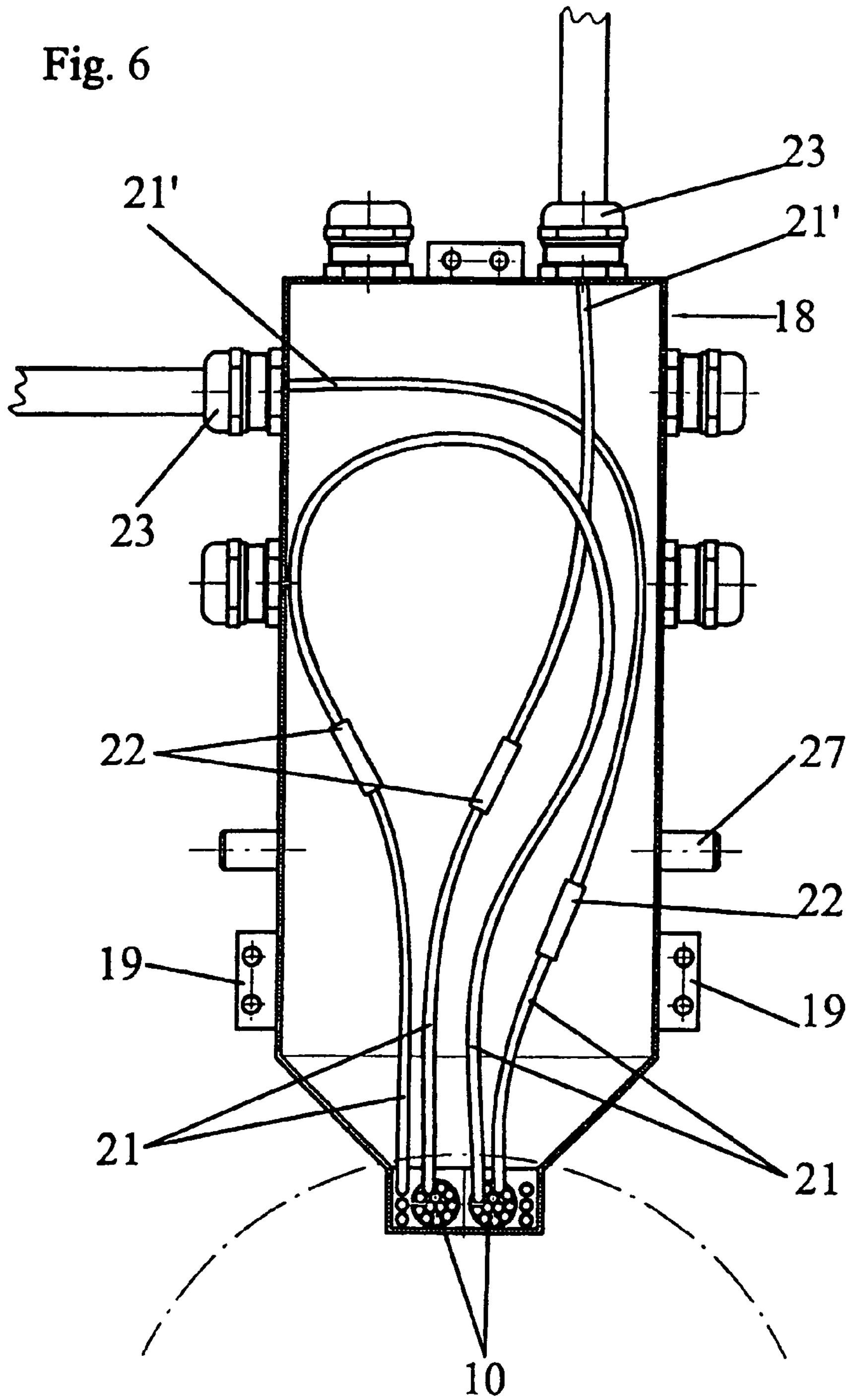
FIG. 6 is a cross section taken along the line VI—VI in FIG. 5 through the conduit box.

With reference to FIGS. 4 to 6, the sewer opens out into a clean-out or inspection shaft 16 that is connected to the surface. A conduit box 18 is mounted on the wall of the shaft in the area of the opening. The conduit box 18 is secured to the wall 17 of the shaft by screws that pass through tabs 19. The conduit box 18 can be coupled to the cable conduit, which is formed from a base 1 and the cheek pieces 2, through an extension piece 20 that is so configured that the individual fiber optic cables 21 are curved in a manner that prevents them from becoming damaged. Within the conduit box 18, the individual fiber optic cables 21 are connected through sleeve connectors 22; the fiber optic cables are then either routed to an adjacent section of the passage, or connected to a branch cable 21' that emerges into the shaft 16 through a twist connector 23 to be routed onward along the wall of the shaft. The conduit box 18 is closed off by a cover 24 so as to be watertight.

In the area of the extension piece 20, the conduit box 18 has on its outside a rounded guide surface 25 that is bordered on its side by projecting cheek pieces 26. This guide surface 25 serves to support a high-pressure cleaning hose that can be introduced into the sewer through the shaft 16, and because of the manner in which it curves, prevents damage to the high-pressure hose at the guide points; the high-pressure hose is prevented from sliding off the side of the guide surface by the cheek pieces 26.

In addition, studs 27 extend from the opposite side surfaces of the conduit box 18; if they are required, guide rollers for a high-pressure cleaning hose or supports for such guide rollers can be mounted on or secured to these studs.

FIG. 1A is a schematic cross section through a cheek piece at a scale that is greater than that used for FIG. 1. The cheek piece 2 has a bottom 30 from which there extend dividers 31 that are, in particular, parallel and end at the lips 8. These flexible lips 8 define the chambers 7 that are formed between the dividers 31. The recess 34 into which the curved end area 6 of the base 1 can be inserted can also be seen in FIG. 1A.

In order to ensure firm installation on a wall, or in particular a ceiling, on which the device is to be installed, in the end area of the cheek piece 2 that is remote from the base there is a distance piece 32 that is preferably perpendicular to the base 1; in principle, this distance piece 32 could also extend the bottom 30. If the base 1 is to be secured to a wall by means of the screw 14, this distance piece is pressed against the wall and thereby forms a seal and simultaneously prevents the uppermost divider 31 of the cheek piece 2, i.e., the one remote from the base, from being bent excessively by small irregularities in the surface of the wall, so that the opening 9 is closed, with the result that subsequent installation of lines is made much more difficult. This distance piece 32 is shown diagrammatically in FIG. 1.

In addition to the foregoing, a flange 33, especially one that is pliable, flexible or elastic, can branch of f from the base bottom 30 toward the interior of the device. This flange subtends an angle of 0° to 60° with the base or with a perpendicular to the bottom 30. This resilient flange 33 is intended to provide elastic or flexible support for or secure the pipe(s) 10 in the interior of a channel 11, as can be seen in FIG. 1.

The distance piece 32 and the resilient flange 33 can be formed in one piece on the cheek pieces 2, and are substantially of the same material.

Both the distance piece 32 and the resilient flange 33 can extend, either continuously or intermittently, along the entire length of the cheek piece 2. In principle, these parts can also be configured in sections or extend across sequential sub-areas of the cheek pieces 2.

We claim:

1. A device for supporting or routing lines, comprising:

a cable conduit for accommodating the lines, said cable conduit being formed with a plurality of interconnected individual segments;

each of said segments having a base and cheek pieces projecting from said base;

said base of a respective said segment being flexibly jointed with said base of an adjoining said segment, and said cheek pieces being formed of a flexible material; and hollow rivets connecting adjacent said segments to one another and extending substantially perpendicular to said base, and wherein said segments are pivotally disposed about an axis of said hollow rivets.

2. The device according to claim 1, wherein said flexible material of said cheek pieces is plastic and said base is formed of sheet metal.

3. The device according to claim 1, wherein said base is formed with edges, and said cheek pieces are formed with side slots configured for accommodating therein said edges of said segments.

4. The device according to claim 3, wherein said edges of said segments are curved in an arc.

5. The device according to claim 1, which further comprises fasteners configured to pass through said hollow rivets and to attach said cable conduit to a wall along which the lines are to be routed.

6. The device according to claim 5, wherein said fasteners are self-tapping screws for anchoring in a wall of a sewer.

7. The device according to claim 6, wherein said self-tapping screws are enclosed, along a threaded section, with a sealant.

8. The device according to claim 7, wherein said sealant is silicone.

9. The device according to claim 1, which comprises a spacer within said cable conduit and protruding from said base.

10. The device according to claim 1, which comprises a spacer within said cable conduit, said spacer protruding from said base and covering said hollow rivets.

11. The device according to claim 10, wherein said spacer is formed of hard foam.

12. The device according to claim 1, which comprises a distance piece at said cheek pieces remote from said base.

13. A device for supporting or routing lines, comprising:

a cable conduit for accommodating the lines, said cable conduit being formed with a plurality of interconnected individual segments;

each of said segments having a base and cheek pieces projecting from said base;

said base of a respective said segment being flexibly jointed with said base of an adjoining said segment; and said cheek pieces being formed of a flexible material and at least one of said cheek pieces being formed with at least one chamber extending in a longitudinal direction of said cable conduit.

14. The device according to claim 13, wherein said chamber is formed with an opening that is at least partly closeable by at least one flexible lip.

15. A device for routing lines in a sewer, comprising:

a cable conduit for accommodating the lines, said cable conduit being formed with a plurality of interconnected individual segments;

each of said segments having a base and cheek pieces formed of flexible material projecting from said base;

said base of a respective said segment being flexibly jointed with said base of an adjoining said segment;

a conduit box mounted in a shaft leading to the sewer, wherein said cable conduit is connected to said conduit box, and said conduit box has an extension piece accommodating the lines and configured for coupling to said cable conduit.

16. The device according to claim 15, wherein said conduit box has rounded guide surface on an outside of an end region thereof, said rounded guide surface incorporating said extension piece.

17. The device according to claim 16, wherein said guide surface is defined by cheek pieces protruding from a side thereof.

18. The device according to claim 16, wherein said conduit box includes laterally protruding studs.

19. A device for supporting or routing lines, comprising:

a cable conduit for accommodating the lines, said cable conduit being formed with a plurality of interconnected individual segments;

each of said segments having a base and cheek pieces projecting from said base;

said base of a respective said segment being flexibly jointed with said base of an adjoining said segment, and said cheek pieces being formed of a flexible material; said cheek pieces having a bottom and a plurality of dividers extending from said bottom, and pairs of adjacent dividers defining respective chambers.

20. The device according to claim 19, wherein said bottom extends perpendicular to said base.

21. A device for supporting or routing lines, comprising:

a cable conduit for accommodating the lines, said cable conduit being formed with a plurality of interconnected individual segments;

each of said segments having a base and cheek pieces projecting from said base;

said base of a respective said segment being flexibly jointed with said base of an adjoining said segment, and said cheek pieces being formed of a flexible material; and a distance piece formed as a spacer flange at an end area of said cheek piece and extending in a direction perpendicular to said base.

22. A device for supporting or routing lines, comprising:

a cable conduit for accommodating the lines, said cable conduit being formed with a plurality of interconnected individual segments;

each of said segments having a base and cheek pieces projecting from said base;

said base of a respective said segment being flexibly jointed with said base of an adjoining said segment, and said cheek pieces being formed of a flexible material; and a distance piece extending from a divider of said cheek piece formed remote from said base, and said distance piece projecting perpendicularly or inclined at an angle of at most 20°.

23. A device for supporting or routing lines, comprising:

a cable conduit for accommodating the lines, said cable conduit being formed with a plurality of interconnected individual segments;

each of said segments having a base and cheek pieces projecting from said base;

said base of a respective said segment being flexibly jointed with said base of an adjoining said segment, and said cheek pieces being formed of a flexible material; and a flange formed on a bottom of said cheek pieces, said flange extending in a direction enclosing an angle of between 0° and 60° with said base and being formed in a region of said cheek pieces remote from said base, and substantially facing towards the opposite one of said cheek pieces.

24. The device according to claim 23, wherein said flange is a pliable or resilient or flexible element.

* * * * *